United States Patent
Kim

(10) Patent No.: US 11,396,304 B2
(45) Date of Patent: Jul. 26, 2022

(54) VEHICLE CONTROL METHOD

(71) Applicant: LG Electronics Inc., Seoul (KR)

(72) Inventor: Taehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 390 days.

(21) Appl. No.: 16/493,412

(22) PCT Filed: Jun. 18, 2019

(86) PCT No.: PCT/KR2019/007356
§ 371 (c)(1),
(2) Date: Sep. 12, 2019

(87) PCT Pub. No.: WO2020/256177
PCT Pub. Date: Dec. 24, 2020

(65) Prior Publication Data
US 2021/0403019 A1 Dec. 30, 2021

(51) Int. Cl.
*B60W 50/14* (2020.01)
*H04W 4/44* (2018.01)
(Continued)

(52) U.S. Cl.
CPC ............. *B60W 50/14* (2013.01); *B60H 1/008* (2013.01); *B60H 1/00742* (2013.01);
(Continued)

(58) Field of Classification Search
CPC ............. B60W 50/14; B60W 60/0015; B60W 60/0051; B60W 40/08; B60W 2556/45;
(Continued)

(56) References Cited

U.S. PATENT DOCUMENTS 5,775,406 A * 7/1998 Ghitea, Jr. ............. B60H 1/008
165/11.1
7,202,792 B2 * 4/2007 Zhang .................. B60K 28/066
340/436
(Continued)

FOREIGN PATENT DOCUMENTS

JP 2019074791 5/2019
KR 20130023535 3/2013
(Continued)

*Primary Examiner* — Nay Tun
(74) *Attorney, Agent, or Firm* — Fish & Richardson P.C.

(57) ABSTRACT

A vehicle control method is disclosed. A vehicle control method according to an embodiment of the present disclosure can determine a drowsy state of a driver through AI processing of state information of the driver acquired from a sensor included in a vehicle. A processor can control a carbon dioxide concentration, a carbon monoxide concentration, a fine dust concentration and cooling efficiency inside the vehicle by causing the outside air to enter the vehicle or circulating the air inside the vehicle upon determining that the driver is in a drowsy state. The processor outputs a second warning and controls driving of the vehicle according to the second warning upon determining that the driver is continuously in the drowsy state. Accordingly, occurrence of accidents due to drowsiness of the driver can be reduced. One or more of an (autonomous vehicle, a user terminal and a server) of the present disclosure can be associated with artificial intelligence modules, drones (unmanned aerial vehicles (UAVs)), robots, augmented reality (AR) devices, virtual reality (VR) devices, devices related to 5G service, etc.

12 Claims, 16 Drawing Sheets

(51) Int. Cl.
   *B60W 60/00*   (2020.01)
   *G06V 40/16*   (2022.01)
   *G06V 20/59*   (2022.01)
   *B60H 1/00*    (2006.01)
   *B60W 40/08*   (2012.01)
   *G06N 3/02*    (2006.01)
   *H04W 56/00*   (2009.01)
   *H04W 72/04*   (2009.01)

(52) U.S. Cl.
   CPC ........ *B60W 40/08* (2013.01); *B60W 60/0015* (2020.02); *B60W 60/0051* (2020.02); *G06N 3/02* (2013.01); *G06V 20/597* (2022.01); *G06V 40/171* (2022.01); *H04W 4/44* (2018.02); *H04W 56/001* (2013.01); *H04W 72/042* (2013.01); *B60W 2040/0827* (2013.01); *B60W 2050/143* (2013.01); *B60W 2050/146* (2013.01); *B60W 2540/221* (2020.02); *B60W 2540/229* (2020.02); *B60W 2556/45* (2020.02)

(58) Field of Classification Search
   CPC ..... B60W 2540/229; B60W 2540/221; B60W 2040/0827; B60W 2050/143; B60W 2050/146; H04W 4/44; H04W 56/001; H04W 72/042; B60H 1/00742; B60H 1/008; G06K 9/00281; G06K 9/00845; G06N 3/02
   See application file for complete search history.

(56) References Cited

U.S. PATENT DOCUMENTS

| | | | |
|---|---|---|---|
| 8,930,086 B2* | 1/2015 | Khanafer | E05F 15/72 701/48 |
| 9,998,899 B1* | 6/2018 | Tannenbaum | G08B 21/0272 |
| 10,272,920 B2* | 4/2019 | Shikii | B60W 50/14 |
| 11,046,179 B2* | 6/2021 | Shikii | B60K 28/06 |
| 2004/0250983 A1* | 12/2004 | Arndt | B60H 1/008 165/11.1 |
| 2007/0159344 A1* | 7/2007 | Kisacanin | G06K 9/00362 340/576 |
| 2009/0277188 A1* | 11/2009 | Teegen | F28F 1/422 62/50.2 |
| 2012/0105637 A1* | 5/2012 | Yousefi | H04L 12/46 348/148 |
| 2015/0105976 A1* | 4/2015 | Shikii | B60H 1/00742 701/36 |
| 2016/0272217 A1* | 9/2016 | Kim | B60W 40/09 |
| 2018/0134112 A1* | 5/2018 | Seiferlein | B60H 1/00821 |
| 2018/0326818 A1* | 11/2018 | Hong | B60H 1/00742 |
| 2019/0300001 A1* | 10/2019 | Watanabe | A61B 5/117 |

FOREIGN PATENT DOCUMENTS

| | | |
|---|---|---|
| KR | 101386823 | 4/2014 |
| KR | 1020170057027 | 5/2017 |
| KR | 1020190063986 | 6/2019 |

* cited by examiner

VEHICLE CONTROL METHOD

CROSS-REFERENCE TO RELATED APPLICATION

This Application is the National Stage filing under 35 U.S.C. 371 of International Application No. PCT/KR2019/007356, filed on Jun. 18, 2019, the contents of which are incorporated by reference.

TECHNICAL FIELD

The present disclosure relates to a vehicle control method and, more specifically, a vehicle control method for sensing driver state information and controlling the air inside a vehicle to be kept pleasant based on the sensed driver state information.

BACKGROUND ART

A vehicle is a means of transportation which moves a user riding therein in a desired direction and a typical example is a car. While such a vehicle provides movement convenience to users, it is necessary to keep eyes on the front and the rear. Here, the front and the rear may refer to objects approaching to or located around a vehicle, that is, driving obstructive factors such as people, vehicles and obstacles.

When a driver drives a vehicle in the wintertime or summertime, the concentration of carbon monoxide increases if air circulation in the vehicle is performed in such a manner that only the air inside the vehicle is circulated, leading to drowsiness and distraction of the driver during driving.

Conventionally, a driver opens windows of a vehicle such that the outside air enters the vehicle or clocks an indoor air circulation button to circulate the air inside the vehicle in order to overcome distraction or drowsiness.

When the air inside a vehicle is circulated through inflow of the outside air, the indoor temperature of the vehicle increases to remarkably decrease air-conditioner efficiency.

DISCLOSURE

Technical Problem

An object of the present disclosure is to solve the aforementioned necessity and/or problems.

Further, an object of the present disclosure is to keep the inside of a vehicle in a pleasant state by determining a state of a driver and automatically controlling the air or temperature inside the vehicle based on the state of the driver.

Further, an object of the present disclosure is to improve reliability of a drowsiness prevention system by determining a drowsy state of a driver through AI processing.

Further, an object of the present disclosure is to prevent occurrence of an accident due to carelessness of a driver by switching a driving mode to an autonomous driving mode when the driver is in a drowsy state even though the inside of a vehicle is kept in a pleasant state.

Technical Solution

A vehicle control method according to one aspect of the present disclosure includes: primarily acquiring state information of a driver and determining a drowsy state of the driver on the basis of the state information of the driver; outputting a first warning when the drowsy state of the driver is recognized; primarily measuring the air inside a vehicle after the first warning; measuring the air inside the vehicle, comparing the measured air with a predetermined fresh air set value and switching to an outside air circulation mode or an inside air circulation mode according to a comparison result; secondarily measuring the air inside the vehicle after switching to the outside air circulation mode or the inside air circulation mode; secondarily acquiring state information of the driver through an internal camera of the vehicle after the secondary measurement; and outputting a second warning and controlling the vehicle according to the second warning when a drowsy state of the driver is recognized on the basis of the state information of the driver.

At least one of a harmful gas, a fine dust concentration, a carbon dioxide concentration and a carbon monoxide concentration may be measured from the air inside the vehicle.

The measured air inside the vehicle may be represented by an indoor air quality index and visualized by being output to a head-up display (HUD).

Harmful material values may be extracted from the harmful gas, the fine dust concentration, the carbon dioxide concentration and the carbon monoxide concentration in the measured air inside the vehicle.

The state information of the driver may include at least one of the number of times of closing the eyelid of the driver, an open size of the eyelid and a moving speed of the eyelid, acquired by analyzing a camera image.

The state information of the driver may include heart rate (HR) information acquired through at least one heart rate (HR) sensor, and the HR information includes a heart rate variability (HRV) signal.

The determining of a drowsy state of the driver may further include: extracting feature values from sensing information acquired through at least one sensor; and inputting the feature values to an artificial neural network (ANN) classifier trained to distinguish a wakeful state and a drowsy state of the driver from each other and determining a drowsy state of the driver from an output of the ANN, wherein the feature values are values by which a wakeful state and a drowsy state of the driver are distinguished from each other.

The vehicle control method may further include transmitting a V2X message including information related to a drowsy state of the driver to other terminals connected to the vehicle through communication.

The controlling of the vehicle according to the second warning may further include: switching a driving mode of the vehicle from a manual driving mode to an autonomous driving mode; and searching for a position at which the vehicle will be stopped and controlling the vehicle such that the vehicle moves to the searched position and driving is finished at the position in the autonomous driving mode.

The vehicle control method may further include receiving downlink control information (DCI) used to schedule transmission of state information of the driver, acquired from at least one sensor included in the vehicle, from a network, wherein the state information of the driver is transmitted to the network on the basis of the DCI.

The vehicle control method may further include performing an initial access procedure with the network on the basis of a synchronization signal block (SSB), wherein the state information of the driver is transmitted to the network over a PUSCH, and the SSB and a DM-RS of the PUSCH are QCLed for QCL type D.

The vehicle control method may further include: controlling a communication unit such that the state information of the driver is transmitted to an AI processor included in the network; and controlling the communication unit such that AI-processed information is received from the AI processor, wherein the AI-processed information is information representing a state of the driver determined to be a wakeful state or a drowsy state.

Advantageous Effects

The effects of the vehicle control method according to the present disclosure are as follows.

The present disclosure can prevent occurrence of accidents due to a drowsy state or carelessness of a driver by controlling air circulation in a vehicle such that the air inside the vehicle is kept in a pleasant state in response to a driving state of the driver.

Further, the present disclosure can improve reliability of a drowsiness prevention system by determining a drowsy state of a driver through AI processing.

Further, the present disclosure can prevent occurrence of accidents due to carelessness of a driver by switching a driving mode to an autonomous driving mode when a drowsy state of the driver is detected even though the air inside the vehicle is kept in a pleasant state.

DESCRIPTION OF DRAWINGS

FIGS. 11 and 12 are diagrams for describing the example illustrated in FIG. 10.

The accompanying drawings, which are included to provide a further understanding of the invention and are incorporated in and constitute a part of this specification, illustrate embodiments of the invention and together with the description serve to explain the principles of the invention.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
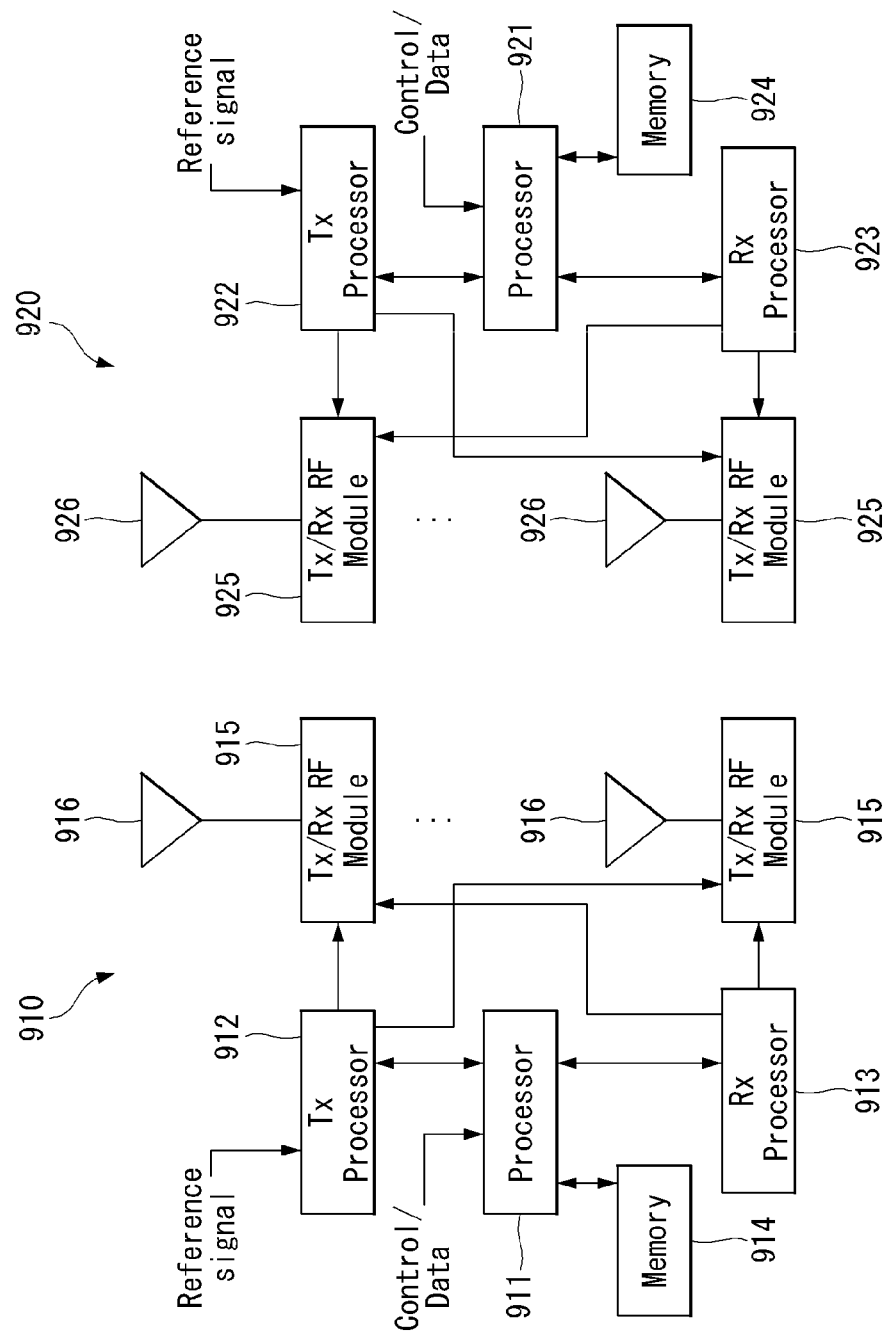
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
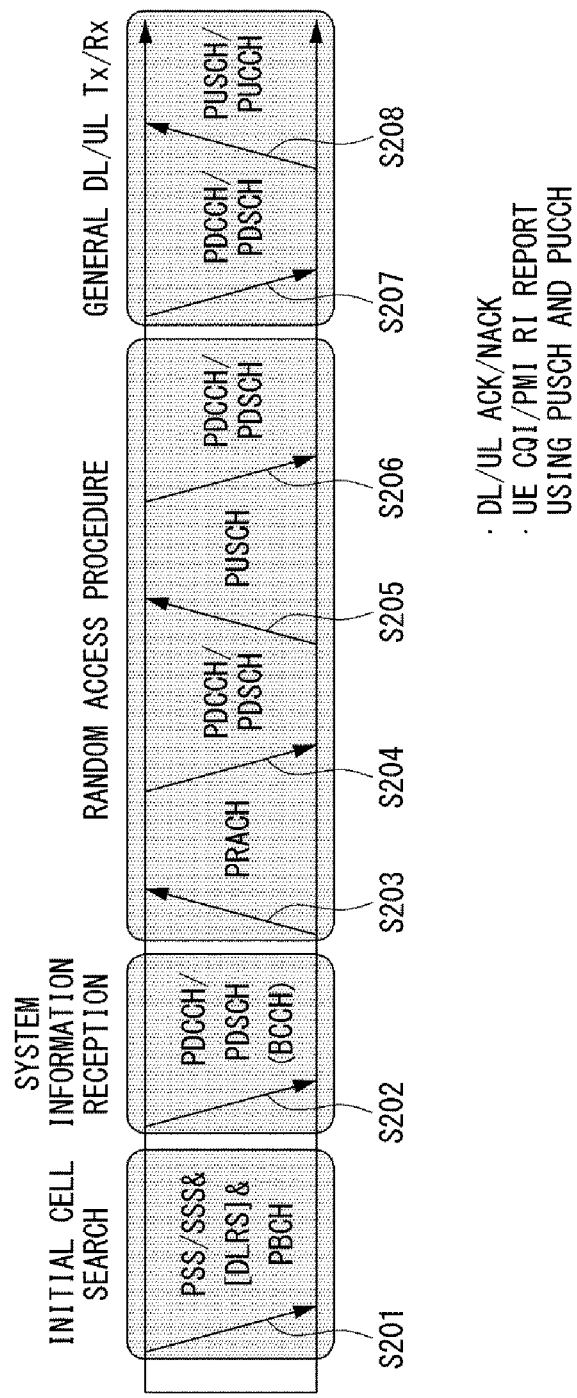
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
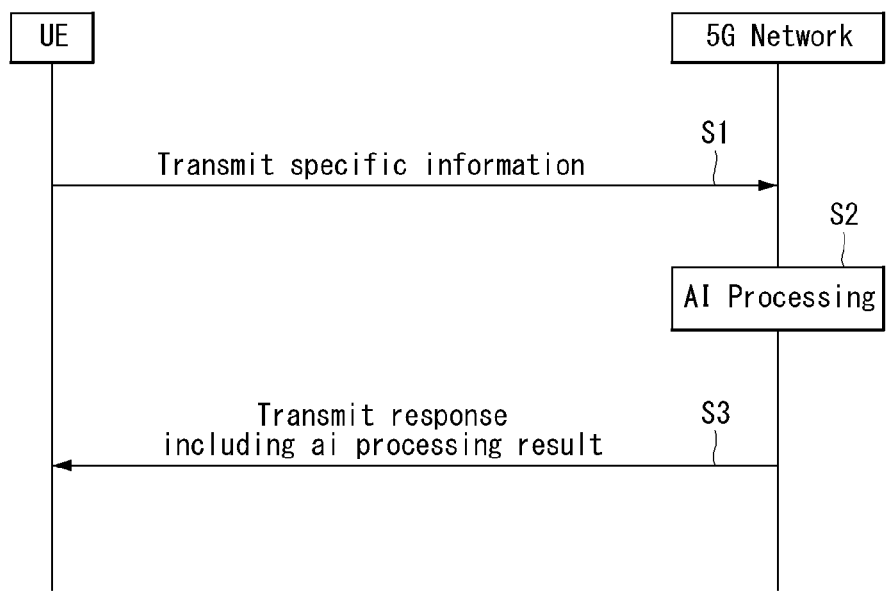
FIG. 3 shows an example of basic operations of an autonomous vehicle and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
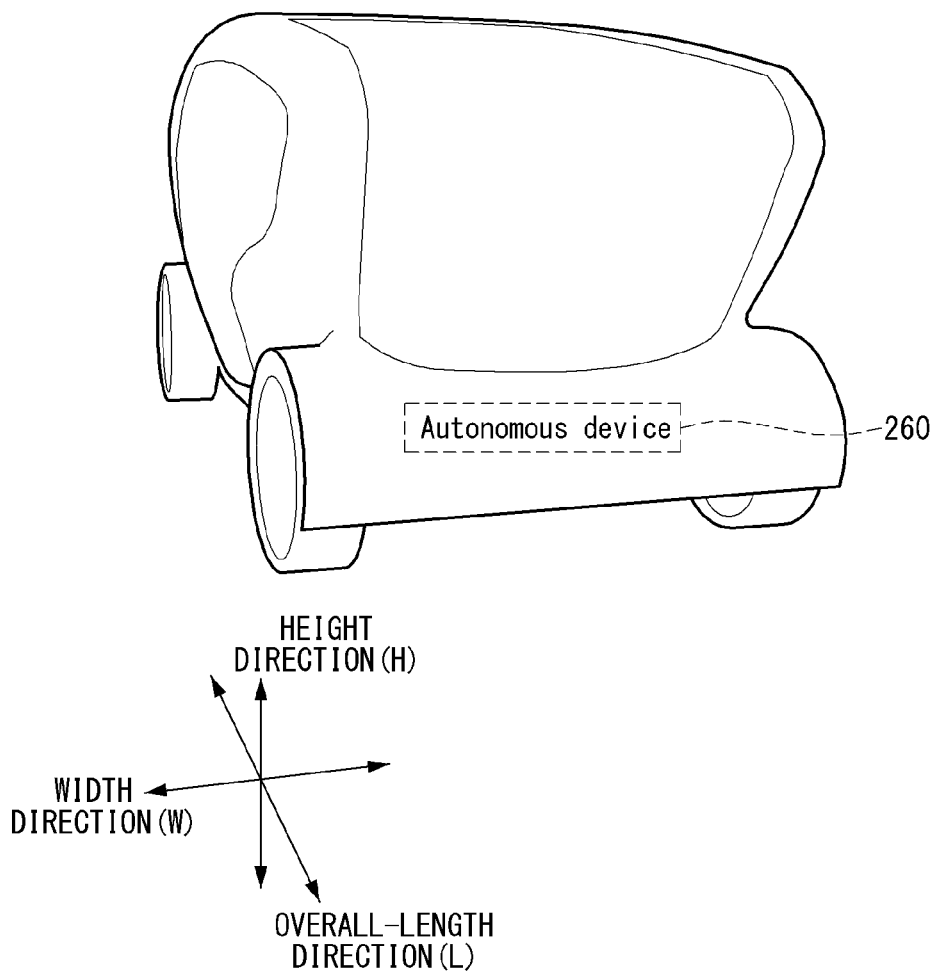
FIG. 4 illustrates a vehicle according to an embodiment of the present disclosure.

FIG. 4 is a diagram showing a vehicle according to an embodiment of the present disclosure.

Referring to FIG. 4, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

Figure 5:
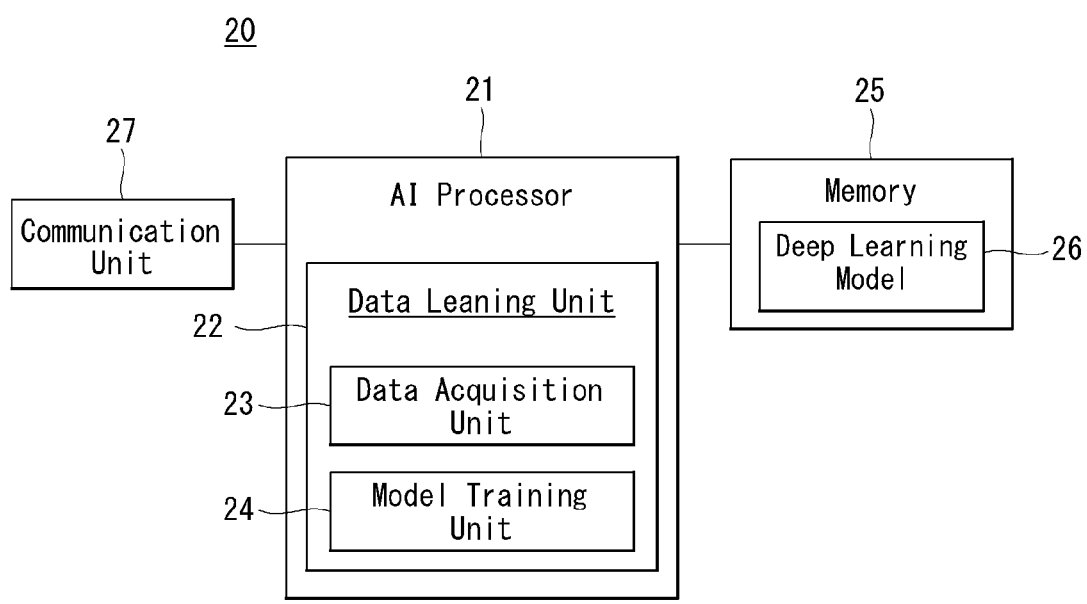
FIG. 5 is a block diagram of an AI device according to an embodiment of the present disclosure.

FIG. 5 is a block diagram of an AI device according to an embodiment of the present disclosure.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 5. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 6:
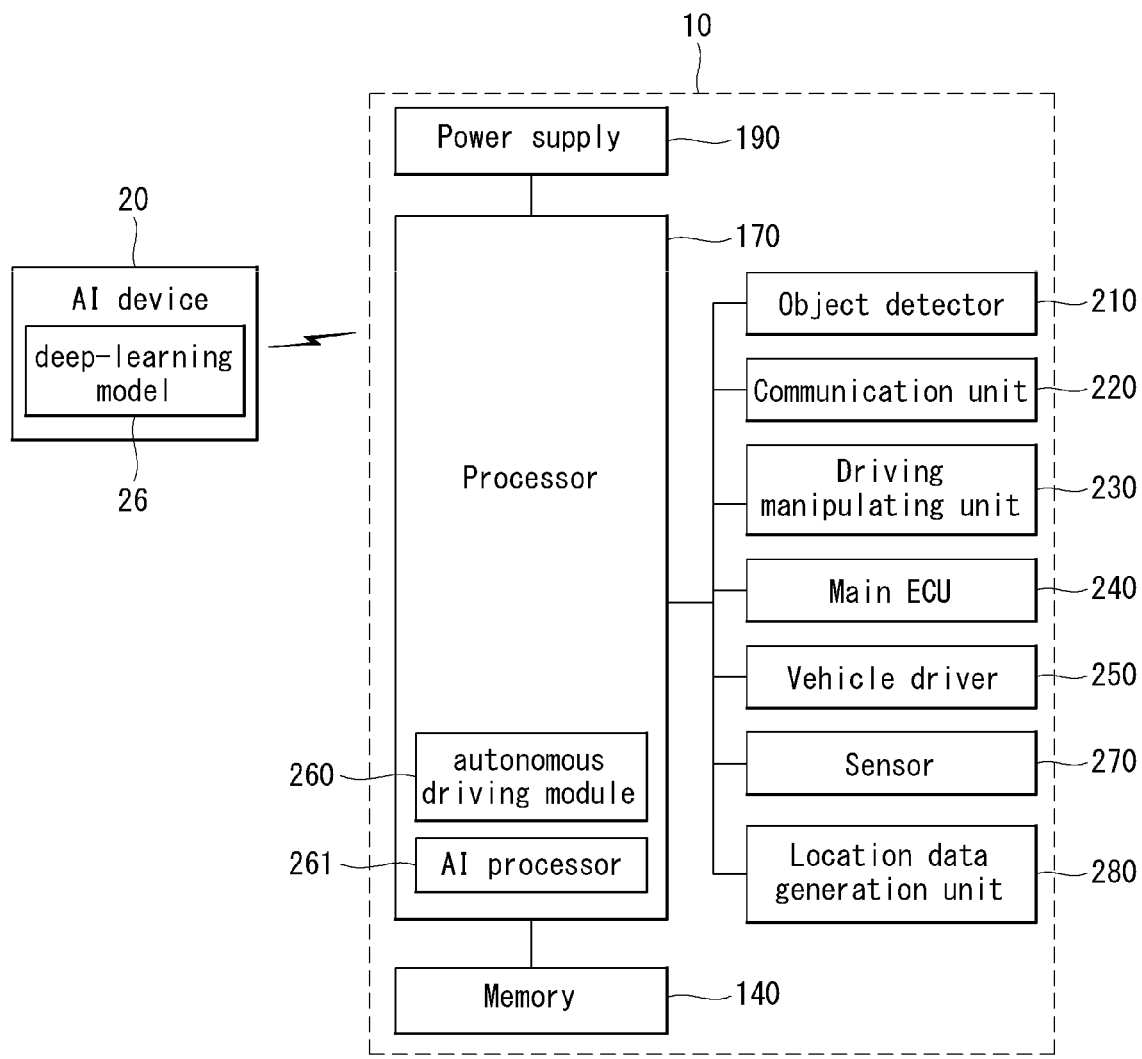
FIG. 6 is a diagram for describing a system in which an autonomous vehicle is associated with an AI device according to an embodiment of the present disclosure.

FIG. 6 is a diagram for describing a system in which an autonomous vehicle is associated with an AI device according to an embodiment of the present disclosure.

Referring to FIG. 6, an autonomous vehicle 10 can transmit data that requires AI processing to an AI device 20 through a communication unit and the AI device 20 including a deep learning model 26 can transmit AI processing results obtained using the deep learning model 26 to the autonomous vehicle 10. Refer to the description with reference to FIG. 2 for the AI device 20.

The autonomous vehicle 10 may include a memory 140, a processor 170 and a power supply 190 and the processor 170 may further include an autonomous driving module 260 and an AI processor 261. Further, the autonomous vehicle 10 may include an interface which is connected to at least one electronic device included in the vehicle in a wired or wireless manner and can exchange data necessary for autonomous driving control. The at least one electronic device connected through the interface may include an object detector 210, a communication unit 220, a driving operator 230, a main ECU 240, a vehicle driver 250, a sensing unit 270, and a positional data generator 280.

The interface can be configured in the form of at least one of a communication module, a terminal, a pin, a cable, a port, a circuit, an element and a device.

The memory 140 is electrically connected to the processor 170. The memory 140 can store basic data with respect to a user, control data for operation control of a unit, and input/output data. The memory 140 can store data processed in the processor 170. The memory 140 can be configured as at least one of a ROM, a RAM, an EPROM, a flash drive and a hard drive in a hardware manner. The memory 140 can store various types of data for overall operation of the autonomous vehicle 10, such as a program for processing or control of the processor 170. The memory 140 may be integrated with the processor 170. According to an embodiment, the memory 140 may be categorized as a subcomponent of the processor 170.

The power supply 190 can provide power to the autonomous vehicle 10. The power supply 190 can be provided with power from a power source (e.g., a battery) included in the autonomous vehicle 10 and supply power to each unit of the autonomous vehicle 10. The power supply 190 can operate according to a control signal provided from the main ECU 240. The power supply 190 may include a switched-mode power supply (SMPS).

The processor 170 can be electrically connected to the memory 140, the interface and the power supply 190 and exchange signals therewith. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be driven by power provided from the power supply 190. The processor 170 can receive data in a state in which power is supplied thereto from the power supply 190, process data, generate signals and provide signals.

The processor 170 can receive information from other devices in the autonomous vehicle 10 through the interface. The processor 170 can provide control signals to other electronic devices in the autonomous vehicle 10.

The autonomous vehicle 10 may include at least one printed circuit board (PCB). The memory 140, the interface, the power supply 190 and the processor 170 can be electrically connected to the PCB.

Hereinafter, other electronic devices in the vehicle which are connected to the interface, the AI processor 261, the autonomous driving module 260 will be described in more detail. For convenience of description, the autonomous vehicle 10 will be called a vehicle 10.

First, the object detector 210 can generate information about objects outside the vehicle 10. The AI processor 261 can generate at least one of information on presence or absence of an object, positional information of the object, information on a distance between the vehicle and the object, and information on a relative speed between the vehicle and the object by applying a neural network model to data acquired through the object detector 210.

The object detector 210 may include at least one sensor which can detect an object outside the vehicle 10. The sensor may include at least one of a camera, a radar, a lidar, an ultrasonic sensor and an infrared sensor. The object detector 210 can provide data about an object generated on the basis of a sensing signal generated in the sensor to at least one electronic device included in the vehicle.

The vehicle 10 can transmit data acquired through the at least one sensor to the AI device 20 through the communication unit 220 and the AI device 20 can transmit AI processing data generated by applying the neural network model 26 to the transmitted data to the vehicle 10. The vehicle 10 can recognize information about a detected object on the basis of received AI processing data and the autonomous driving module 260 can perform an autonomous driving control operation using the recognized information.

The communication unit 220 can exchange signals with devices located outside the vehicle 10. The communication device 220 can exchange signals with at least one of infrastructures (e.g., a server and a broadcasting station), other vehicles, and terminals. The communication unit 220 may include at least one of a transmission antenna, a reception antenna, a radio frequency (RF) circuit capable of implementing various communication protocols, and an RF element for performing communication.

It is possible to generate at least one of information on presence or absence of an object, positional information of the object, information on a distance between the vehicle and the object, and information on a relative speed between the vehicle and the object by applying the neural network model to data acquired through the object detector 210.

The driving operator 230 is a device which receives user input for driving. In a manual mode, the vehicle 10 can travel on the basis of a signal provided by the driving operator 230. The driving operator 230 may include a steering input device (e.g., a steering wheel), an acceleration input device (e.g., an accelerator pedal), and a brake input device (e.g., a brake pedal).

The AI processor 261 can generate an input signal of the driving operator 230 according to a signal for controlling movement of the vehicle according to a driving plan generated through the autonomous driving module 260 in an autonomous driving mode.

The vehicle 10 can transmit data necessary for control of the driving operator 230 to the AI device 20 through the communication unit 220, and the AI device 20 can transmit AI processing data generated by applying the neural network model 26 to the transmitted data to the vehicle 10. The vehicle 10 can use the input signal of the driving operator 230 for control of movement of the vehicle on the basis of the received AI processing data.

The main ECU 240 can control overall operation of at least one electronic device included in the vehicle 10.

The vehicle driver 250 is a device which electrically controls various vehicle driving devices in the vehicle 10. The vehicle driver 250 may include a power train driving control device, a chassis driving control device, a door/window driving control device, a safety device driving control device, a lamp driving control device and an air-conditioner driving control device. The power train driving control device may include a power source driving control device and a transmission driving control device. The chassis driving control device may include a steering driving control device, a brake driving control device and a suspension driving control device. Further, the safety device driving control device may include a safety belt driving control device for safety belt control.

The vehicle driver 250 includes at least one electronic control device (e.g., a control electronic control unit (ECU)).

The vehicle driver 250 can control a power train, a steering device and a brake device on the basis of signals received from the autonomous driving module 260. The signals received from the autonomous driving module 260 may be driving control signals generated by applying vehicle related data to the neural network model in the AI processor 261. The driving control signals may be signals received from the AI device 20 through the communication unit 220.

The sensing unit 270 can senses a state of the vehicle. The sensing unit 270 may include at least one of an inertial measurement unit (IMU) sensor, a collision sensor, a wheel sensor, a speed sensor, an inclination sensor, a weight sensor, a heading sensor, a positon module, a vehicle forward/reverse movement sensor, a battery sensor, a fuel sensor, a tire sensor, a steering sensor, a temperature sensor, an air sensor, a humidity sensor, an ultrasonic sensor, an illumination sensor, and a pedal position sensor. The IMU sensor may include at least one of an acceleration sensor, a gyro sensor and a magnetic sensor.

The AI processor 261 can generate state data of the vehicle by applying the neural network model to sensing data generated in the at least one sensor. AI processing data generated using the neural network model may include vehicle position data, vehicle motion data, vehicle yaw data, vehicle roll data, vehicle pitch data, vehicle collision data, vehicle heading data, vehicle angle data, vehicle speed data, vehicle acceleration data, vehicle tilting data, vehicle forward/reverse movement data, vehicle weight data, battery data, fuel data, tire pressure data, vehicle internal temperature data, vehicle internal humidity data, steering wheel rotation angle data, vehicle outside illumination data, data of a pressure applied to an accelerator pedal, and data of a pressure applied to a brake pedal.

The autonomous driving module 260 can generate a driving control signal on the basis of AI-processed vehicle state data.

Meanwhile, the vehicle 10 can transmit sensing data acquired through at least one sensor to the AI device 20 through the communication unit 22 and the AI device 20 can transmit AI processing data generated by applying the neural network model 26 to the transmitted sensing data to the vehicle 10.

The positional data generator 280 can generate positional data of the vehicle 10. The positional data generator 280 can include at least one of a global positioning system (GPS) and a differential global positioning system (DGPS).

The AI processor 261 can generate more accurate positional data of the vehicle by applying the neural network model to positional data generated in at least one positional data generating device.

According to an embodiment, the AI processor 261 can perform a deep learning operation on the basis of at least one of an IMU of the sensing unit 270 and a camera image of the object detector 210 and correct positional data on the basis of the generated AI processing data.

The vehicle 10 can transmit the positional data acquired from the positional data generator 280 to the AI device 20 through the communication unit 22 and the AI device 20 can transmit AI processing data generated by applying the neural network model 26 to the received positional data to the vehicle 10.

The vehicle 10 can include an internal communication system (not shown). A plurality of electronic devices included in the vehicle 10 can exchange signals through the internal communication system (not shown). The signals may include data. The internal communication system (not shown) can use at least one communication protocol (e.g., CAN, LIN, FlexRay, MOST or Ethernet).

The autonomous driving module 260 can generate a path for autonomous driving on the basis of acquired data and generate a driving plan for driving along the generated path.

The autonomous driving module 260 can implement at least one advanced driver assistance system (ADAS) function. The ADAS can implement at least one of an adaptive cruise control (ACC) system, an autonomous emergency braking (AEB) system, a forward collision warning (FCW) system, a lane keeping assist (LKS) system, a lane change assist (LCK) system, a target following assist (TFA) system, a blind spot detection (BSD) system, an adaptive high beam assist (HBA) system, an auto parking system (APS), a PD collision warning system, a traffic sign recognition (TSR) system, a traffic sign assist (TSA) system, a night vision (NV) system, a driver status monitoring (DSM) system and a traffic jam assist (TJA) system.

The AI processor 261 can transmit a control signal for executing at least one of the aforementioned ADAS functions to the autonomous driving module 260 by applying information received from at least one sensor included in the vehicle, traffic related information received from an external device and information received from other vehicles communicating with the vehicle to the neural network model.

Further, the vehicle 10 can transmit data for executing ADAS functions to the AI device 20 through the communication unit 22 and the AI device 20 can transmit control signals for executing the ADAS functions to the vehicle 10 by applying the neural network model 26 to the received data.

The autonomous driving module 260 can acquire state information of a driver and/or state information of the vehicle through the AI processor 261 and perform an operation of switching from an autonomous driving mode to a manual driving mode or an operation of switching from the manual driving mode to the autonomous driving mode on the basis of the acquired information.

Further, the vehicle 10 may include an air purifier 290. The air purifier 290 can purify the outside air entering the vehicle 10 or purify the air circulating in the vehicle.

The AI processor 161 can sense various dusts or particles filtered by the air purifier 290, perform a deep learning operation on the basis of the sensed dusts or particles and correct filter on the basis of generated AI processing data.

The vehicle 10 can use AI processing data for passenger assistance for driving control. For example, states of a driver and a passenger can be checked through at least one sensor included in the vehicle as described above.

Further, the vehicle 10 can recognize a voice signal of a driver or a passenger through the AI processor 161, perform a voice processing operation and perform a voice synthesis operation.

5G communication necessary to realize the vehicle control method according to an embodiment of the present disclosure and a method of performing AI processing through 5G communication and transmitting/receiving AI processing results have been described.

Hereinafter, a detailed method for intervening in a careless state of a driver passively or actively on the basis of driver state information according to an embodiment of the present disclosure will be described with reference to necessary drawings.

Figure 7:
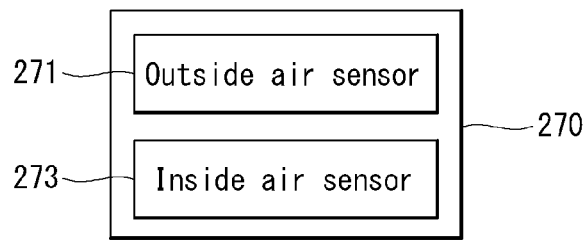
FIG. 7 is a diagram for describing a sensing unit according to an embodiment of the present disclosure.

FIG. 7 is a diagram for describing the sensing unit according to an embodiment of the present disclosure.

Referring to FIG. 7, the sensing unit 270 according to an embodiment of the present disclosure may include an outside air sensor 271 and an inside air sensor 273.

The sensing unit 270 can include the outside air sensor 271 for senses the outside air entering the vehicle 10 and the inside air sensor 273 for sensing the air circulating inside of the vehicle 10.

The outside air sensor 271 may be attached to a front grill (not shown) of the vehicle 10, measure harmful gases or fine dust in the outside air entering the vehicle from the front of the vehicle and transmit or output the measurement result to the processor 170.

The inside air sensor 273 can be provided inside the vehicle 10, measure harmful gases, fine dust, carbon dioxide and carbon monoxide inside the vehicle and transmit or output the measurement result to the processor 170.

Figure 8:
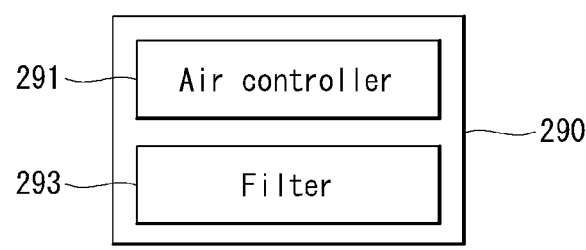
FIG. 8 is a diagram for describing an air purifier according to an embodiment of the present disclosure.

FIG. 8 is a diagram for describing an air purifier according to an embodiment of the present disclosure.

Referring to FIG. 8, an air purifier 290 of the present disclosure can include an air controller 291 and a filter 293.

The air controller 290 can switch a mode to an outside air circulation mode or an inside air circulation mode according to a control signal of the processor 170 and control the filter 293.

The processor 170 can be provided with information about the outside air measured around the vehicle 10, the outside air entering the vehicle 10 and the air inside the vehicle 10, which is measured or sensed through the sensing unit 270 in real time and provide the information to the air controller 290. The air controller 290 can keep the air inside the vehicle 10 pleasant by controlling the outside air entering the vehicle 10 or the air circulating inside of the vehicle 10 under the control of the processor 170.

The filter 293 is provided inside the vehicle 10 can purify the air inside the vehicle. The filter 293 can filter harmful gases or fine dust contained in the outside air flowing from the front of the vehicle 10 to purify the air inside the vehicle. For example, the filter 293 can include a HEPA filter which can remove 99.9% or more of fine dust having a size of 0.3 μm or more when the fine dust passes through the filter.

The air controller 291 can check the filter 293 in real time and display a replacement time of the filter 293 or a contamination level of the filter 293 on a navigation device of a display provided in the vehicle 10 or provide the same to a mobile terminal of a driver.

Further, the air controller 291 can control the wind strength of the outside air or the inside air passing through the filter 293 by controlling the outside air circulation mode or the inside air circulation mode. For example, when information representing a relatively large amount of fine dust in the outside air measured around the vehicle is transmitted, the air controller 291 can efficiently remove the fine dust through the filter 293 by controlling the wind strength of the inflow outside air through the outside air circulation mode.

The performance of the filter 293 can depend on the wind strength of the outside air passing through the filter 293. Accordingly, the air controller 291 can improve the performance of the filter 293 by controlling the wind strength of the outside air through the outside air circulation mode.

Figure 9:
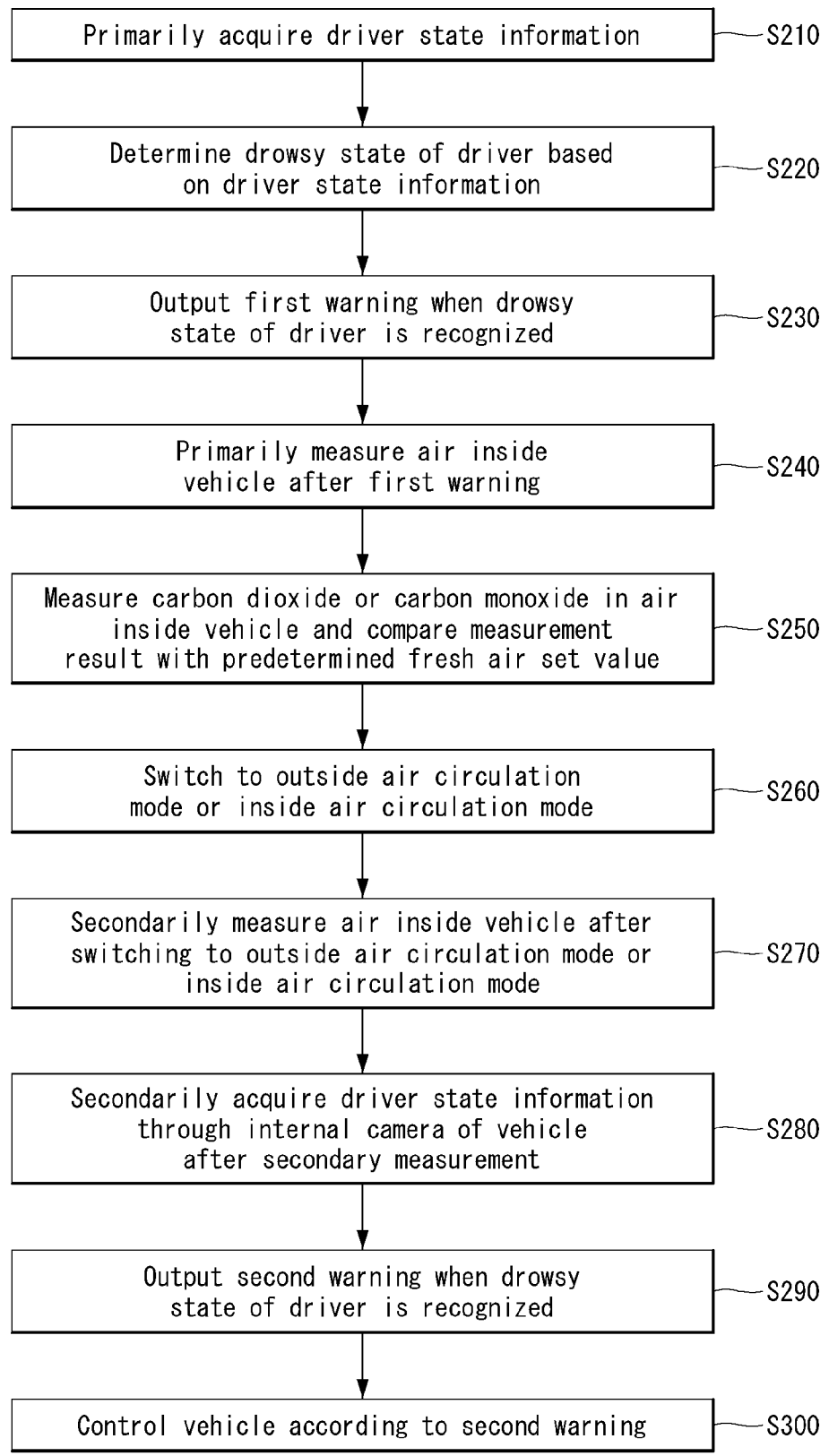
FIG. 9 is a flowchart of a vehicle control method according to an embodiment of the present disclosure.

FIG. 9 is a flowchart of a vehicle control method according to an embodiment of the present disclosure.

The vehicle control method according to an embodiment of the present disclosure can be implemented in a vehicle including the functions described with reference to FIGS. 1 to 8 or an intelligent device which controls the vehicle. More specifically, the vehicle control method according to an embodiment of the present disclosure can be implemented in the vehicle 10 described with reference to FIGS. 4 and 8.

The processor (170 in FIG. 5) can primarily acquire driver state information (S210).

The processor 170 can primarily acquire the driver state information through at least one sensor included in the vehicle. The driver state information may be referred to as first driver state information.

The at least one sensor may be at least one camera included in the vehicle 10. The camera may be called an internal camera. For example, the camera may be disposed to photograph a driver in every direction. The processor 170 can analyze an image acquired from the camera and use at least one of the number of times of closing the eyelid of the driver, an open size of the eyelid and a moving speed of the eyelid to determine a state of the driver. For example, when a moving speed of the eyelid, that is, an eye blinking speed exceeds a predetermined reference value, a driver state can be determined to be a drowsy state. Further, a length of eye blinking may be measured and a drowsy state may be determined on the basis of a length of eye blinking in a wakeful state, for example. That is, the processor 170 can analyze an image acquired through the camera using the number of times of closing the eyelid of the driver, an open size of the eyelid and a moving speed of the eyelid in a wakeful state of the driver as reference values and transmit analysis results to the processor 170.

Further, the processor 170 can extract feature points (eyes, eyebrows, lips, glasses, etc.) from an image of the face of a driver captured through the camera. The processor 170 can detect positions of the feature points on a face coordinate system (x, y, z) generated on the basis of a face center point. Here, the face coordinate system may be generated on the basis of any point in the image other than the face center point. The processor 170 can calculate a face movement amount and a face rotation amount on the basis of changes in the positions of the feature points on the face coordinate system according to face movement of the driver. The face movement amount may refer to a face movement distance caused by movement of the body and the face rotation amount may refer to a direction vector representing a biaxial rotation angle (Roll, Pitch, Yaw). The processor 170 can store the position and the direction vector of the face of the driver in real time, the direction vector of the face can be detected in various manners.

Further, the at least one sensor may include at least one heart rate (HR) sensor. The driver state information may include HR information acquired through the HR sensor. The HR information may include a heart rate variability (HRV) signal. The HR sensor is carried by a driver and may be physically attached to the body of the driver. Further, the HR sensor may be separated from the driver by a predetermined distance and detect the heart rate of the driver through an imaging technique, for example. The HR sensor may be configured to continuously or passively capture the heart rate of the driver during driving and to output a timestamp data stream including a current value of captured heart rate information.

The HR sensor may be packaged in a wearable device. The vehicle 10 can transmit HR information wirelessly transmitted from the wearable device worn by the driver to a 5G network. Further, the wearable device may directly transmit a timestamp data stream output from the HR sensor to the 5G network through a wireless communication unit without passing through the vehicle. Such wireless communication can be realized using a Bluetooth personal area network. Further, wireless communication may be realized using a Wi-Fi short-range communication network or a combination of different wireless network techniques.

The processor 170 can determine a drowsy state of the driver on the basis of the driver state information (S220).

A detailed process of determining a drowsy state will be described later with reference to FIG. 10. As described above, determination of a drowsy state on the basis of the driver state information may be performed in the vehicle 10 or the 5G network.

The processor 170 can output a first warning when a drowsy state of the driver is detected (S230). The first warning may be output through a head-up display (HUD) or a speaker of the vehicle. For example, an HUD mounted in the vehicle may use an optical see-through information provision method. An optical see-through method is a method in which a user views a virtual object overlaid on a transparent display while viewing the outside world with the naked eyes through the transparent display. Optical see-through method applicable to vehicles can be largely classified into a display panel method, a laser method and a projection method according to implementation methods. Since various implementations of optical see-through are known, description thereof is omitted.

After output of the first warning, the air inside the vehicle can be primarily measured (S240). The inside air sensor 273 can primarily measure harmful gases, fine dust, carbon dioxide, carbon monoxide and the like inside or outside the vehicle 10 and transmit or output the measurement results to the processor 170. The primarily measured inside air may be referred to as a first measured air. The first measured air may include concentrations and pollution levels with respect to harmful gases, fine dust, carbon dioxide, carbon monoxide and the like inside or outside the vehicle 10.

The inside air sensor 273 can indicate the first measured air as an indoor air quality index of the vehicle. For example, the indoor air quality index can be represented as a real-time air quality index (AQI). Accordingly, indoor air pollution can be represented as an indoor air quality index.

The processor 170 can be provided with the first measured air and output the indoor air quality index of the vehicle to the HUD to visualize the first measured air.

The processor 170 can measure carbon dioxide or carbon monoxide in the air inside the vehicle by controlling the inside air sensor 273 and compare the measurement result with a predetermined fresh air set value (S250). The processor 170 can compare the measured inside air with the predetermined fresh air set value and switch to the outside air circulation mode or the inside air circulation mode (S260). For example, the processor 170 can switch the outside air circulation mode to the inside air circulation mode when the measured inside air is less than the predetermined fresh air set value.

The outside air circulation mode may be called an external air circulation mode and the inside air circulation mode may be called an internal air circulation mode.

When the measured inside air is higher than the predetermined fresh air set value, the processor 170 can switch the inside air circulation mode to the outside air circulation mode. In the case of switching to the outside air circulation mode, the processor 170 can detect concentrations and pollution levels with respect to harmful gases, fine dust, carbon dioxide and carbon monoxide in the outside air and purify the outside air by controlling the sensing unit 270 and the air purifier 290.

Thereafter, the processor 170 can switch the outside air circulation mode to the inside air circulation mode to circulate the inside air of the vehicle and secondarily measure the inside air of the vehicle (S270).

The inside air sensor 273 can secondarily measure harmful gases, fine dust, carbon dioxide and carbon monoxide inside the vehicle 10 under the control of the processor 170 and transmit or output measurement results to the processor 170. The secondarily measured inside air may be referred to as a second measured air. The second measured air may include concentrations and pollution levels with respect to harmful gases, fine dust, carbon dioxide and carbon monoxide inside the vehicle 10.

The processor 170 can compare the second measured air with the prestored first measured air and analyze the comparison result to calculate a change in the inside air of the vehicle.

The processor 170 can operate the air purifier 290 in response to the changed inside air of the vehicle. For example, when a larger amount of fine dust than a reference value is sensed in the changed inside air of the vehicle, the processor 170 can filter the inside air of the vehicle through a HEPA filter to re-purify the inside air of the vehicle.

The processor 170 can be provided with the second measured air from the inside air sensor 273, convert the second measured air into an indoor air quality index of the vehicle and output the indoor air quality index to the HUD to visualize the same.

As primary measurement, driver state information can be secondarily acquired through an internal camera of the vehicle (S280). A method of secondarily acquiring driver state information may be substantially the same as the above-described method of primarily acquiring driver state information.

After secondary acquisition of the driver state information, a second warning may be output when a drowsy state of the driver is detected on the basis of the driver state information (S290). The processor 170 can determine a drowsy state of the driver on the basis of the driver state information. The processor 170 can output the second warning upon detection of the drowsy state of the driver.

After output of the second warning, the processor 170 can control the vehicle according to the second warning (S300).

The processor 170 can switch the driving mode of the vehicle from the manual driving mode to the autonomous driving mode upon detection of a drowsy state of the driver. For example, the processor 170 can search for a predetermined position at which the vehicle will be stopped and control driving of the vehicle such that the vehicle moves to the searched position and driving is finished at the searched position in the autonomous driving mode.

The processor 170 can output a driving plan in the autonomous driving mode through an HUD message or an audio output unit although the driver has been deprived of the control for driving due to the drowsy state. Meanwhile, when the driving mode has switched to the autonomous driving mode according to the second warning, the processor 170 can display an indicator indicating the current driving mode on a display inside the vehicle.

If the aforementioned first warning is a passive intervention for alarming a careless state of the driver, the second warning and vehicle control according to the second warning may be an active intervention process. For example, the active intervention process may be outputting a loud sound for waking the driver up, switching to the autonomous driving mode or forcing the vehicle to move to a specific position and ending driving thereat in the autonomous driving mode.

Figure 10:
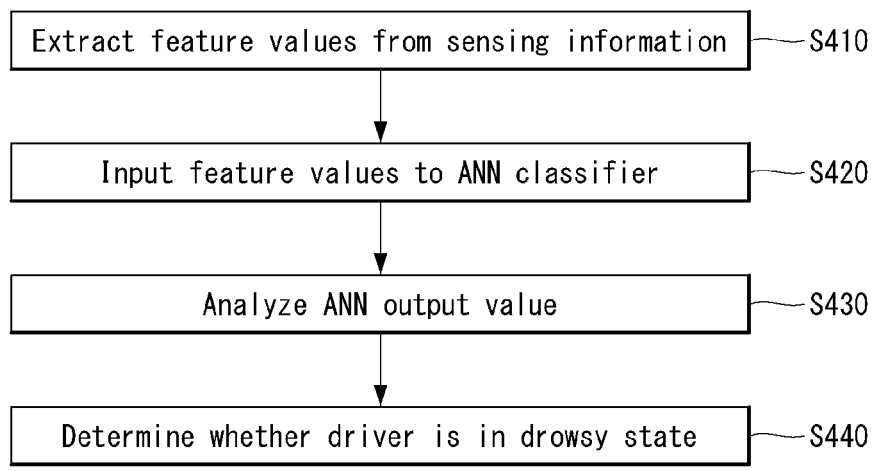
FIG. 10 is a diagram for describing an example of determining a drowsy state in an embodiment of the present disclosure.

FIG. 10 is a diagram for describing an example of determining a drowsy state in an embodiment of the present disclosure.

Referring to FIG. 10, the processor 170 can extract feature values from sensing information acquired through at least one sensor in order to determine a drowsy state of the driver (S410).

For example, the processor 170 can receive heart rate information from at least one sensor (e.g., an HR sensor). The processor 170 can extract feature values from the heart rate information. The feature values are determined to indicate switching from a wakeful state to a drowsy state of the driver from among at least one feature that can be extracted from the heart rate information.

The processor 170 can control the feature values to be input to an artificial neural network (ANN) classifier trained to distinguish a wakeful state of the driver from a drowsy state (S420).

The processor 170 can combine the extracted feature values to generate a drowsiness detection input. The drowsiness detection input can be input to the ANN classifier trained to distinguish a wakeful state of the driver from a drowsy state on the basis of the extracted feature values.

The processor 170 can analyze an output value of the ANN (S430) and determine a drowsy state of the driver on the basis of the ANN output value (S440).

The processor 170 can detect whether the driver start nodding or is in a drowsy state from the output of the ANN classifier.

Meanwhile, although an example in which the operation of detecting a drowsy state of the driver through AI processing is implemented in processing of the vehicle 10 has been described in FIG. 10, the present disclosure is not limited thereto. For example, AI processing may be performed on a 5G network on the basis of sensing information received from the vehicle 10.

Figure 11:
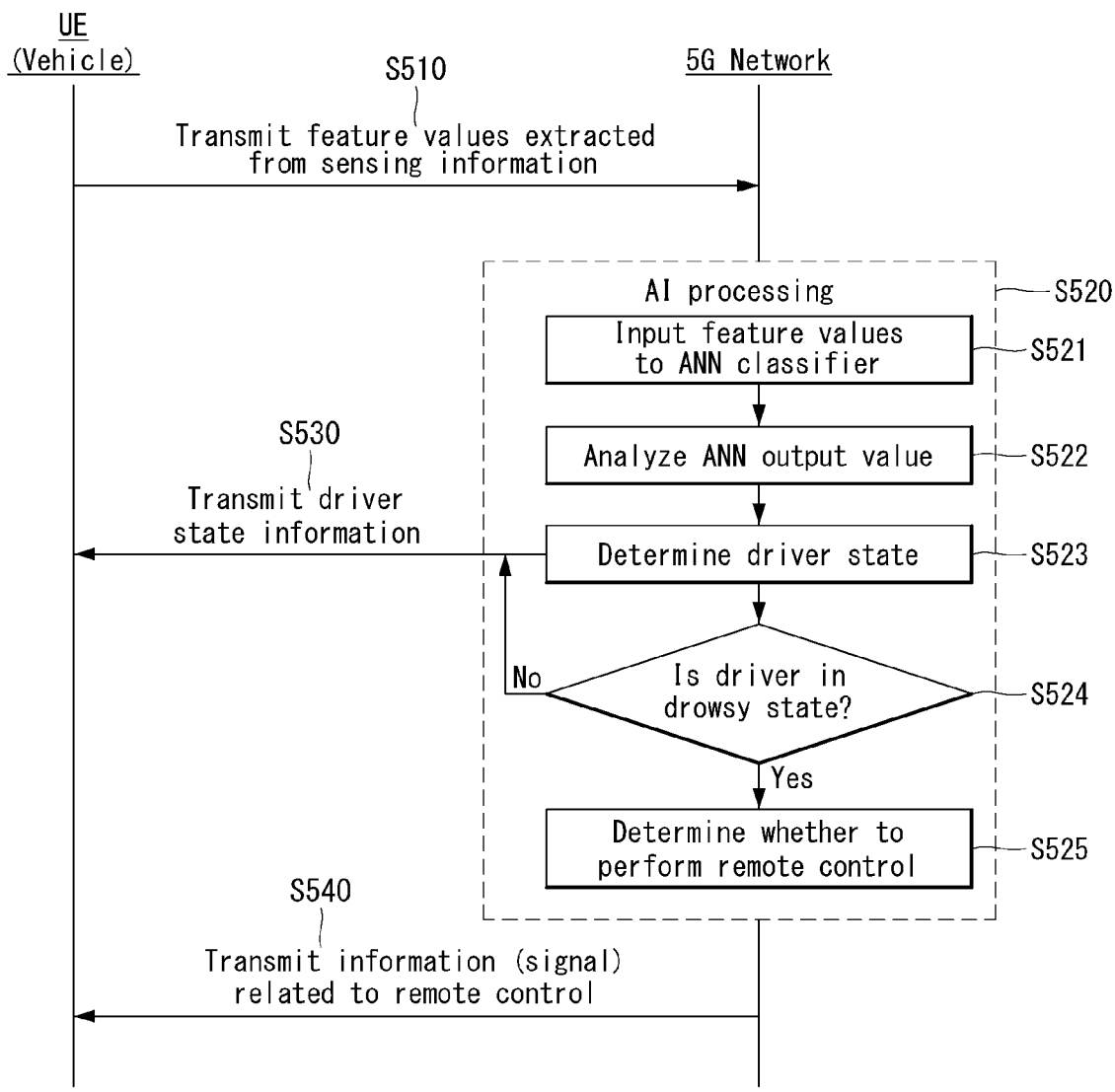
FIG. 11 is a diagram for describing another example of determining a drowsy state in an embodiment of the present disclosure.

FIG. 11 is a diagram for describing another example of determining a drowsy state in an embodiment of the present disclosure.

The processor 170 can control the communication unit such that driver state information is transmitted to an AI processor included in a 5G network. Further, the processor 170 can control the communication unit such that AI-processed information is received from the AI processor.

The AI-processed information may be information representing a state of the driver determined to be any one of a wakeful state or a drowsy state.

The vehicle 10 can perform an initial access procedure with the 5G network in order to transmit the driver state information to the 5G network. The vehicle 10 can perform the initial access procedure with the 5G network on the basis of a synchronization signal block (SSB).

Further, the vehicle 10 can receive downlink control information (DCI) used to schedule transmission of driver state information acquired from at least one sensor included in the vehicle through an RF communication unit from the network.

The processor 170 can transmit the driver state information to the network on the basis of the DCI.

The driver state information is transmitted to the network over a PUSCH, and the SSB and a DM-RS of the PUSCH can be QCLed for QCL type D.

Referring to FIG. 11, the vehicle 10 can transmit feature values extracted from sensing information to the 5G network (S510).

Here, the 5G network may include the AI processor or an AI system and the AI system of the 5G network can perform AI processing on the basis of the received sensing information (S520).

The AI system can input the feature values received from the vehicle 10 to an ANN classifier (S521). The AI system can analyze an ANN output value (S522) and determine a state of the driver from the ANN output value (S523). The 5G network can transmit the driver state information determined in the AI system to the vehicle 10 through an RF communication unit (S530).

For example, the driver state information may include a wakeful state of the driver, a drowsy state, a state in which a wakeful state starts to switch to a drowsy state, and the like.

When the driver is determined to be in a drowsy sate (including a case in which a wakeful state starts to switch to a drowsy state) (S524), the AI system can switch the vehicle traveling in the manual driving mode to the autonomous driving mode to control such that the driver in the drowsy state is deprived of the control for driving.

When the driver is in a drowsy state, the AI system can determine whether to perform remote control (S525). The AI system can transmit information (or a signal) related to remote control to the vehicle 10 (S540).

The vehicle 10 may transmit only sensing information to the 5G network and extract feature values corresponding to a drowsy detection input to be used as an input of an artificial neural network for determining a drowsy state of the driver from the sensing information in the AI system included in the 5G network.

Further, although not illustrated, the vehicle 10 can transmit a message related to a drowsy state of the driver to other vehicles through V2X communication upon confirmation of the drowsy state of the driver according to an embodiment of the present disclosure. A V2X terminal installed in the vehicle 10 can exchange various messages with neighboring V2X base stations, V2X terminals installed in other vehicles, and a V2X terminal of a driver or a pedestrian through V2X communication.

Further, a V2X terminal of a driver or a pedestrian can also exchange various messages with neighboring V2X base stations and V2X terminals installed in vehicles through V2X communication.

According to an embodiment of the present disclosure, the vehicle 10 can transmit a message related to a drowsy state of the driver to other vehicles through V2X communication upon confirmation of the drowsy state of the driver.

Figure 12:
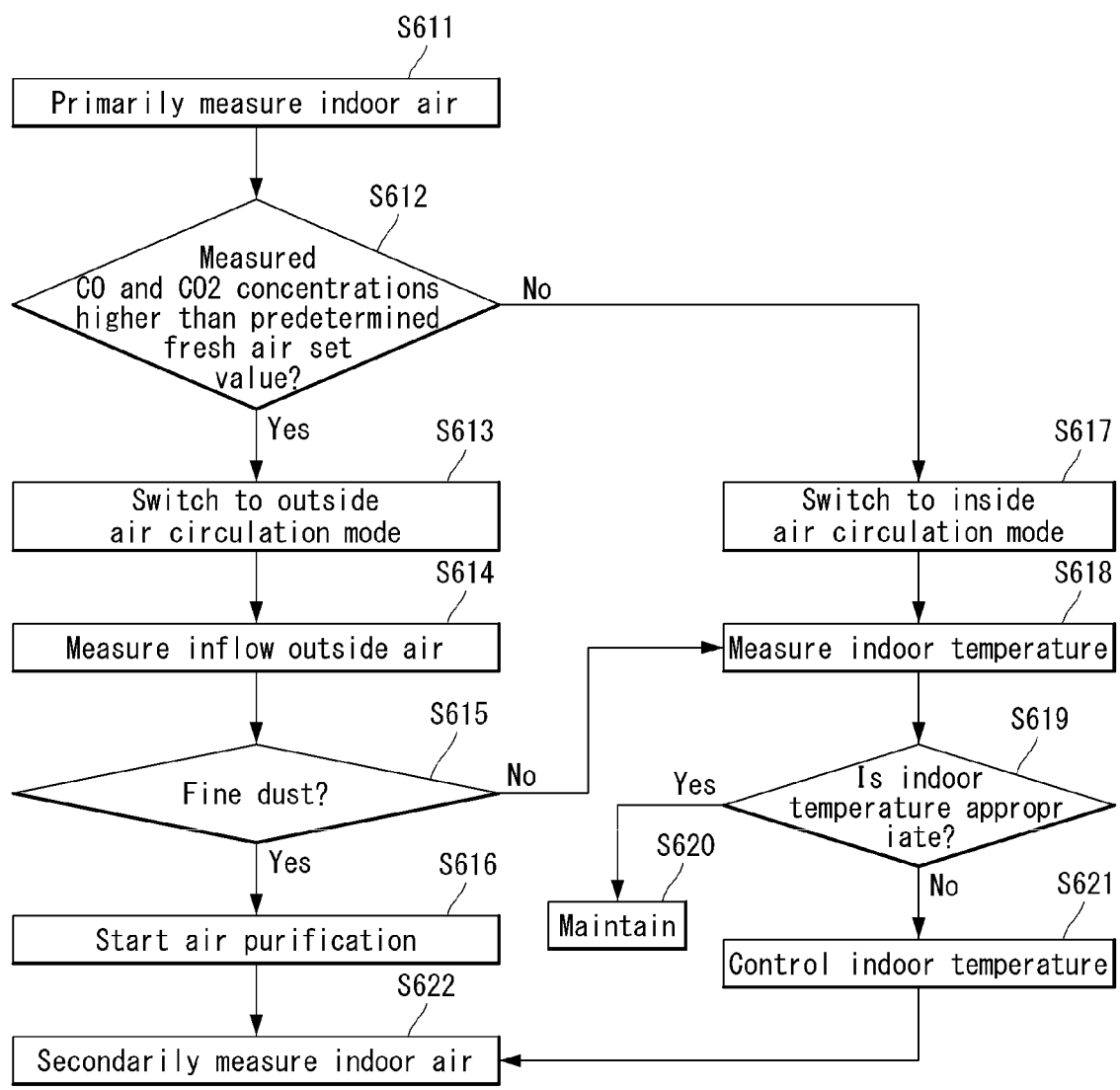
FIG. 12 illustrates a method of measuring the air inside a vehicle and controlling the air inside the vehicle on the basis of the measured air according to an embodiment of the present disclosure.

FIG. 12 illustrates a method of measuring the air inside the vehicle and controlling the air inside the vehicle in response to the measured air inside the vehicle.

Referring to FIG. 12, the processor 170 can primarily measure the air inside the vehicle (S611). The inside air sensor 273 can primarily measure harmful gases, fine dust, carbon dioxide, carbon monoxide and the like inside the vehicle 10 under the control of the processor 170.

The processor 170 can control the inside air sensor 273 to measure carbon dioxide or carbon monoxide in the air inside the vehicle and compare the measurement result with a predetermined fresh air set value (S612). If the measured inside air is higher than the predetermined fresh air set value, the processor 170 can determine that the measured inside air is not fresh and switch the inside air circulation mode to the outside air circulation mode (S613).

The processor 170 can measure the outside air flowing from the outside of the vehicle in real time when the inside air circulation mode is switched to the outside mode circulation mode (S614).

The outside air sensor 291 can sense the outside air flowing from the outside of the vehicle under the control of the processor 170 and the inside air sensor 293 can sense the air inside the vehicle under the control of the processor 170.

The inside air sensor 293 can sense fine dust in the air entering the vehicle from the outside (S615).

When the fine dust is not sensed, the processor 170 can measure the indoor temperature of the vehicle (S618).

When the fine dust is sensed, the processor 170 can purify the air inside the vehicle (S616). The processor 170 can extract harmful material values from harmful gases or fine dust with respect to the outside air sensed by the outside air sensor 291, analyze the extracted harmful material values, input the analyzed harmful material values to an ANN classifier trained for filtering and control the air purifier 290 to purify the air.

The filter 293 included in the air purifier 290 may be disposed between the outside air sensor 291 and the inside air sensor 293. The air controller 291 can efficiently filter harmful gases or fine dust included in the outside air by controlling the filter 293. As described above, the processor 170 can detect the concentrations and pollution levels of harmful gases, fine dust, carbon dioxide and carbon monoxide in the outside air and purify the air by controlling the sensing unit 270 and the air purifier 290.

Thereafter, the processor 170 can secondarily measure the air inside the vehicle (S622).

Further, when the measured inside air is lower than the predetermined fresh air set value, the processor 170 can determine that the measured inside air is fresh and switch the outside air circulation mode to the inside air circulation mode (S617). Alternatively, the processor 170 may continuously maintain the inside air circulation mode.

Thereafter, the processor 170 can measure the indoor temperature of the vehicle (S618). The processor 170 can determine whether the measured indoor temperature of the vehicle is appropriate (S619).

The processor 170 can maintain the indoor temperature of the vehicle upon determining that the measured indoor temperature of the vehicle is appropriate (S620).

The processor 170 can control the indoor temperature of the vehicle upon determining that the measured indoor temperature of the vehicle is not appropriate (S621).

The processor 170 can analyze the surrounding environment of the vehicle and driver state information to control the indoor temperature of the vehicle. For example, when the outside temperature of the vehicle is relatively high and a drowsy state of the driver is detected, the processor 170 can control the air-conditioner of the vehicle to operate in a high power mode in order to rapidly decrease the indoor temperature of the vehicle.

Thereafter, the processor 170 can secondarily measure the air inside the vehicle (S622).

FIGS. 13 to 16 are diagrams for describing carbon dioxide concentrations and temperatures measured in the vehicle according to an embodiment of the present disclosure.

The AI system can input harmful material values measured through the outside air sensor 291 or the inside air sensor 293 to the ANN classifier. The AI system can analyze an ANN output value, determine the state of the inside of the vehicle from the ANN output value and control the air purifier 290 or the sensing unit 270 to control cooling efficiency, the concentration of carbon dioxide ($CO_2$) and the concentration of carbon monoxide (CO).

Figure 13:
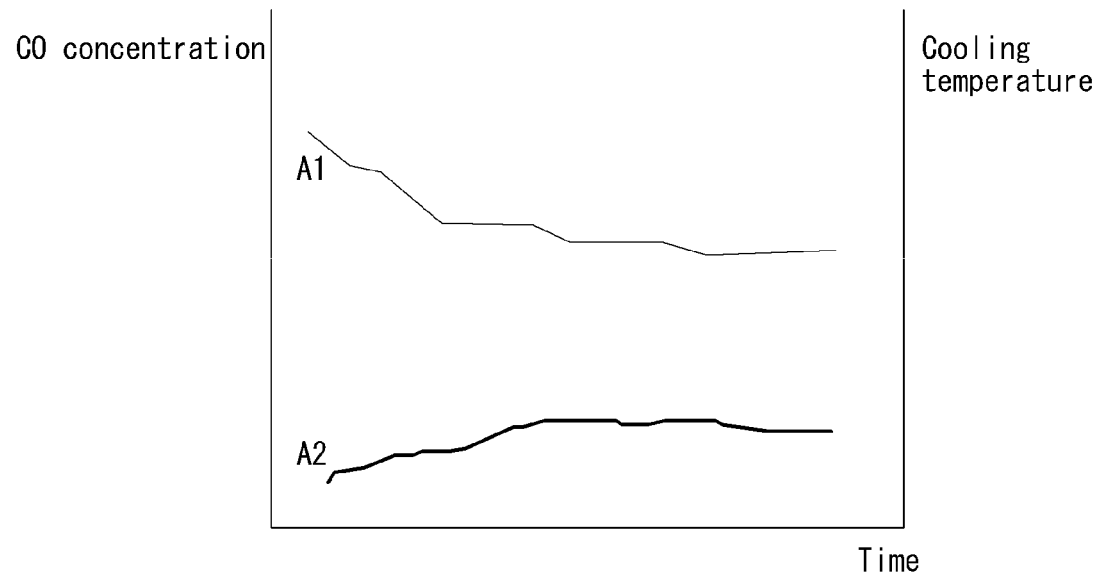
FIGS. 13 to 16 are diagrams for describing carbon dioxide and temperatures measured in a vehicle according to an embodiment of the present disclosure.

As illustrated in FIG. 13, cooling efficiency A1 in the vehicle may gradually decrease when the outside air is used. The concentration A2 of carbon dioxide ($CO_2$) or carbon monoxide (CO) may gradually decrease as the outside air is used.

Figure 14:
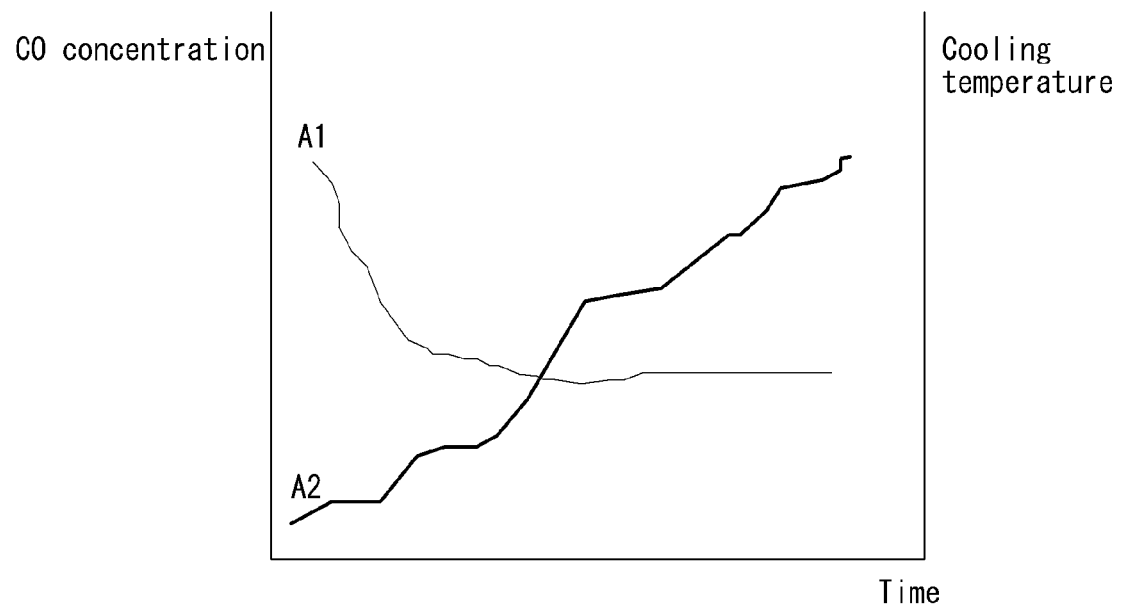

As illustrated in FIG. 14, cooling efficiency A1 in the vehicle may gradually increase when the inside air is used. The concentration A2 of carbon dioxide ($CO_2$) or carbon monoxide (CO) may gradually increase as the inside air is used in the vehicle.

Figure 15:
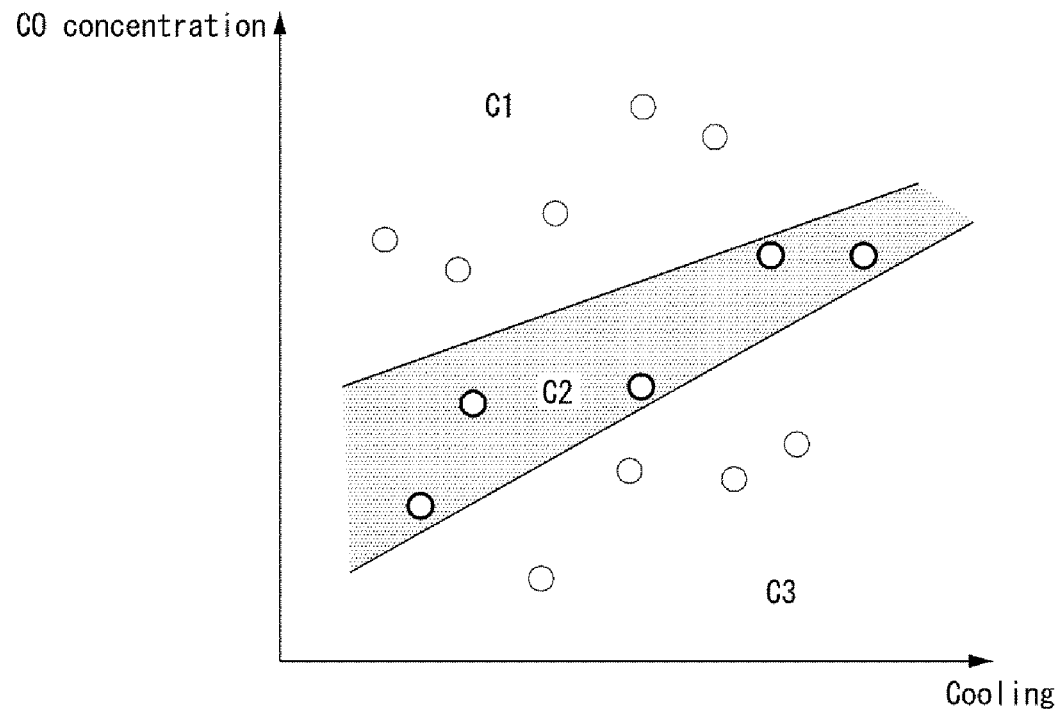
Figure 16:
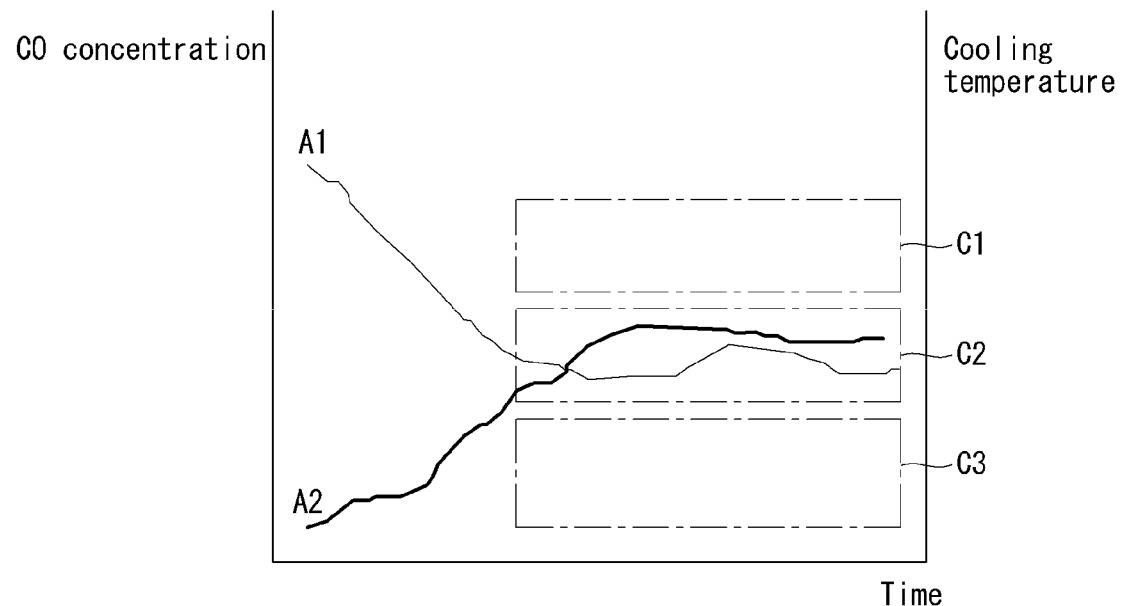

As illustrated in FIGS. 15 and 16, areas C1 and C3 may be areas in which all of cooling efficiency, the concentration of carbon dioxide ($CO_2$) and the concentration of carbon monoxide (CO) cannot be satisfied.

An area C2 may be an area in which all of cooling efficiency, the concentration of carbon dioxide ($CO_2$) and the concentration of carbon monoxide (CO) can be satisfied. That is, optimum levels of cooling efficiency, the concentration of carbon dioxide ($CO_2$) can be maintained in the area C2.

Figure 17:
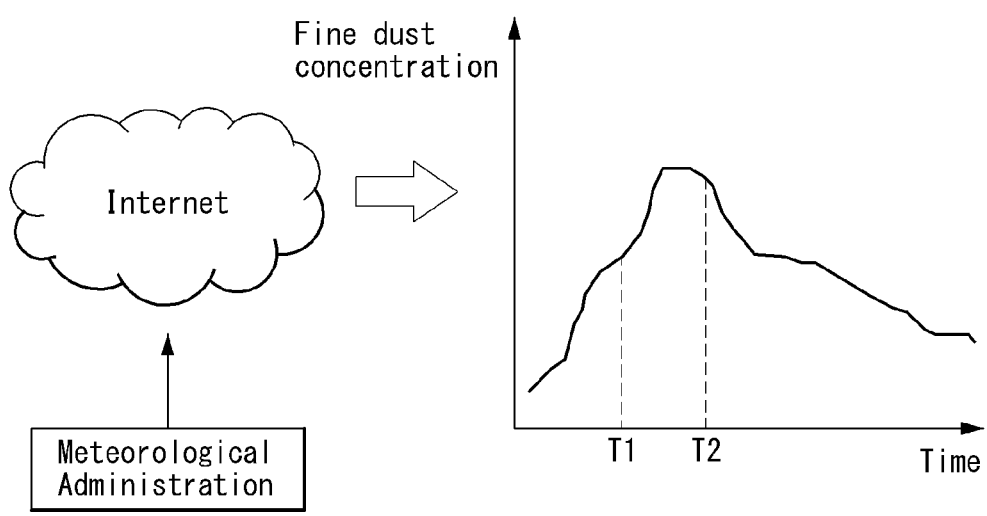
FIGS. 17 to 19 are diagrams for describing carbon dioxide and fine dust measured in a vehicle according to an embodiment of the present disclosure.
Figure 18:
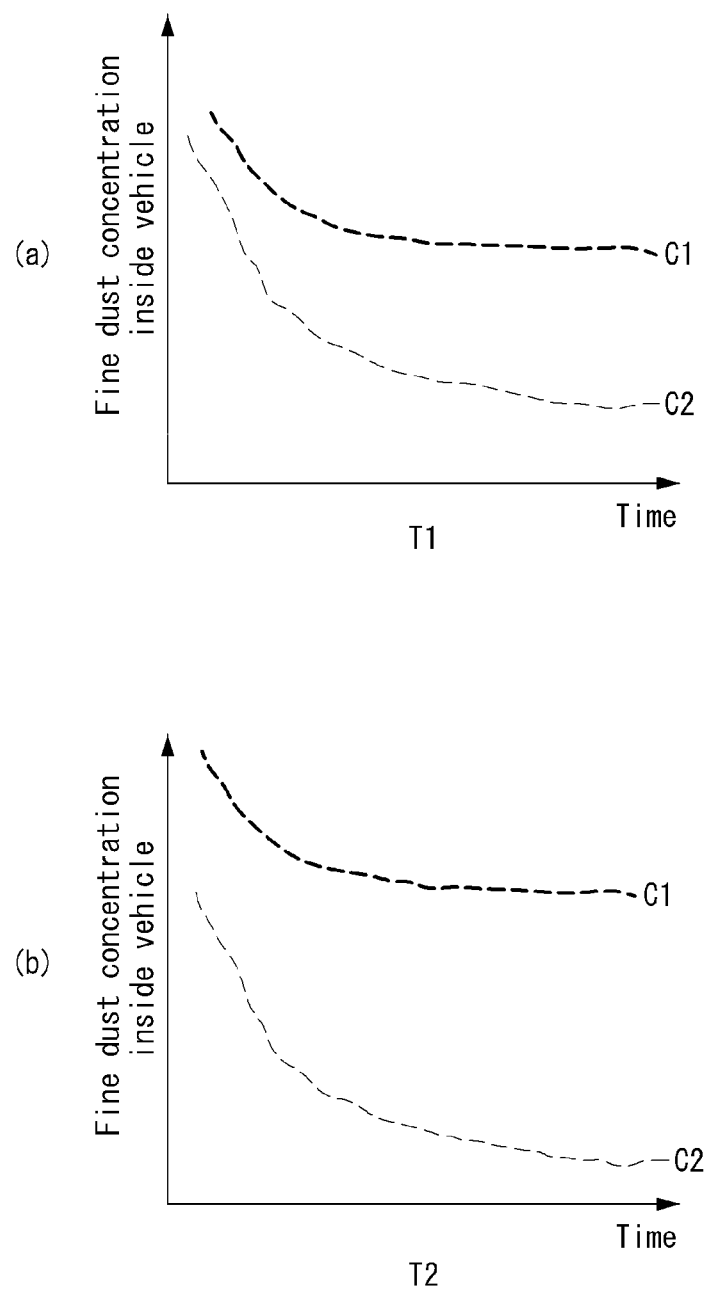
Figure 19:
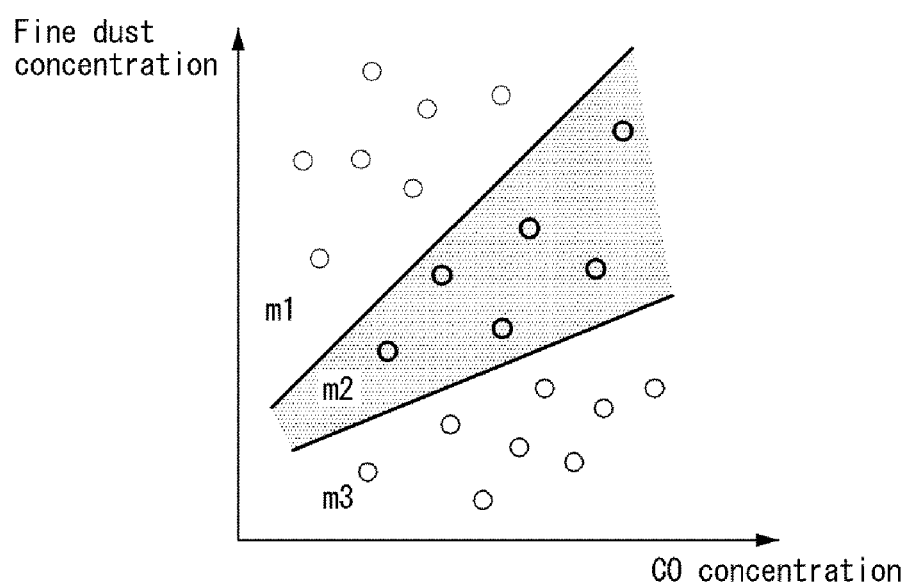

FIGS. 17 to 19 are diagrams for describing carbon dioxide and fine dust measured inside the vehicle according to an embodiment of the present disclosure.

As shown in FIG. 17, the vehicle can be connected to the Meteorological Administration and the 5G network. The vehicle can perform an initial access procedure with the 5G network in order to be provided with information about fine dust from the Meteorological Administration. The vehicle can perform the initial access procedure with the 5G network on the basis of a synchronization signal block (SSB).

The vehicle can minimize the amount of fine dust entering the vehicle by receiving information about fine dust from the Meteorological Administration and controlling the outside air circulation mode in response to fine dust. That is, the vehicle can control fine dust entering the vehicle by receiving an air quality index value of an area in which the vehicle is traveling or moving from the Meteorological Administration in real time.

As shown in FIGS. 18(a) and (b), fine dust concentrations inside the vehicle when the outside air is circulated in the outside air circulation mode and when the inside air is circulated in the inside air circulation mode can be indicated. A difference between the air quality inside the vehicle when the outside air has been circulated and the air quality inside the vehicle when the inside air has been circulated may be generated.

The fine dust concentration in FIG. 18(b) may be higher than that in FIG. 18(a). That is, a difference between the atmospheric qualities or air qualities inside the vehicle when the outside air has been circulated and when the inside air has been circulated can increase as the fine dust concentration increases.

As shown in FIG. 19, the vehicle can learn a difference between the atmospheric qualities or air qualities inside the vehicle when the outside air has been circulated and when the inside air has been circulated and set a range in which the fine dust concentration can be reduced to an average value or lower while appropriately maintaining the concentration of carbon dioxide and the concentration of carbon monoxide.

For example, areas m1 and m3 may be areas in which all of the fine dust concentration, carbon dioxide concentration and carbon monoxide concentration cannot be satisfied.

On the other hand, an area m2 may be an area in which all of the fine dust concentration, carbon dioxide concentration and carbon monoxide concentration can be satisfied. That is, optimum levels of the fine dust concentration, carbon dioxide concentration and carbon monoxide concentration inside the vehicle can be maintained in the area m2.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A vehicle control method comprising:
primarily acquiring state information of a driver and determining a drowsy state of the driver on the basis of the state information of the driver;
outputting a first warning when the drowsy state of the driver is recognized;
primarily measuring air inside a vehicle after the first warning;
measuring the air inside the vehicle, comparing the measured air with a predetermined fresh air set value, and switching to an outside air circulation mode or an inside air circulation mode according to a comparison result;
secondarily measuring the air inside the vehicle after switching to the outside air circulation mode or the inside air circulation mode;
secondarily acquiring state information of the driver through an internal camera of the vehicle after secondarily measuring the air inside the vehicle; and
outputting a second warning and controlling the vehicle according to the second warning when a drowsy state of the driver is recognized on the basis of the secondarily acquired state information of the driver.

2. The vehicle control method of claim 1, wherein the measuring of the air inside the vehicle comprises measuring at least one of a harmful gas, a fine dust concentration, a carbon dioxide concentration and a carbon monoxide concentration.

3. The vehicle control method of claim 2, wherein the measured air inside the vehicle is represented by an indoor air quality index and visualized by being output to a head-up display (HUD).

4. The vehicle control method of claim 2, wherein the measuring of the air inside the vehicle comprises extracting harmful material values from the harmful gas, the fine dust concentration, the carbon dioxide concentration and the carbon monoxide concentration.

5. The vehicle control method of claim 1, wherein the primarily acquired state information of the driver and the secondarily acquired state information of the driver include at least one of a number of times of closing an eyelid of the driver, an open size of the eyelid, and a moving speed of the eyelid, acquired by analyzing a camera image.

6. The vehicle control method of claim 1, wherein the primarily acquired state information of the driver and the secondarily acquired state information of the driver include heart rate (HR) information acquired through at least one heart rate (HR) sensor, and the HR information includes a heart rate variability (HRV) signal.

7. The vehicle control method of claim 1, wherein the determining of a drowsy state of the driver further comprises:
extracting feature values from sensing information acquired through at least one sensor; and
inputting the feature values to an artificial neural network (ANN) classifier trained to distinguish a wakeful state and a drowsy state of the driver from each other and determining a drowsy state of the driver from an output of the ANN,
wherein the feature values are values by which a wakeful state and a drowsy state of the driver are distinguished from each other.

8. The vehicle control method of claim 1, further comprising transmitting a vehicle-to-everything (V2X) message including information related to a drowsy state of the driver to other terminals connected to the vehicle through communication.

9. The vehicle control method of claim 1, wherein the controlling of the vehicle according to the second warning further comprises:
switching a driving mode of the vehicle from a manual driving mode to an autonomous driving mode; and
searching for a position at which the vehicle will be stopped and controlling the vehicle such that the vehicle moves to the searched position and driving is finished at the position in the autonomous driving mode.

10. The vehicle control method of claim 1, further comprising receiving downlink control information (DCI) used to schedule transmission of state information of the driver, acquired from at least one sensor included in the vehicle, from a network,
wherein the primarily acquired state information of the driver and the secondarily acquired state information of the driver are transmitted to the network on the basis of the DCI.

11. The vehicle control method of claim 10, further comprising performing an initial access procedure with the network on the basis of a synchronization signal block (SSB),
wherein the primarily acquired state information of the driver and the secondarily acquired state information of the driver are transmitted to the network over a Physical Uplink Shared Channel (PUSCH), and the SSB and a demodulation reference signal (DM-RS) of the PUSCH are quasi co-located (QCLed) for quasi-co-location (QCL) type D.

12. The vehicle control method of claim 11, further comprising:
controlling a communication unit such that the primarily acquired state information of the driver and the secondarily acquired state information of the driver are transmitted to an artificial intelligence (AI) processor included in the network; and
controlling the communication unit such that AI-processed information is received from the AI processor, wherein the AI-processed information is information representing a state of the driver determined to be a wakeful state or a drowsy state.

* * * * *